US012782579B2

(12) United States Patent
Osborn et al.

(10) Patent No.: US 12,782,579 B2
(45) Date of Patent: Nov. 3, 2026

(54) SYSTEMS AND METHODS FOR REAL-TIME LIDAR RANGE CALIBRATION

(71) Applicant: Waymo LLC, Mountain View, CA (US)

(72) Inventors: Stephen Osborn, Redwood City, CA (US); Blaise Gassend, East Palo Alto, CA (US); Pierre-Yves Droz, Los Altos, CA (US); Luke Wachter, San Francisco, CA (US); Ionut Iordache, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1173 days.

(21) Appl. No.: 17/435,582

(22) PCT Filed: Mar. 4, 2020

(86) PCT No.: PCT/US2020/020936

§ 371 (c)(1),
(2) Date: Sep. 1, 2021

(87) PCT Pub. No.: WO2020/180954

PCT Pub. Date: Sep. 10, 2020

(65) Prior Publication Data

US 2022/0155456 A1 May 19, 2022

Related U.S. Application Data

(60) Provisional application No. 62/813,860, filed on Mar. 5, 2019.

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4813* (2013.01); *G01S 7/4817* (2013.01); *G01S 7/4865* (2013.01); *G01S 17/89* (2013.01)

(58) Field of Classification Search
CPC .... G01S 7/4813; G01S 7/4817; G01S 7/4865; G01S 7/4818; G01S 7/4812; G01S 17/10
See application file for complete search history.

(56) References Cited

U.S. PATENT DOCUMENTS

| | | | | |
|---|---|---|---|---|
| 5,249,157 | A | 9/1993 | Taylor | |
| 7,312,855 | B1 * | 12/2007 | Hintz | G01S 7/4802 356/342 |

(Continued)

FOREIGN PATENT DOCUMENTS

| | | |
|---|---|---|
| CN | 101034155 | 9/2007 |
| CN | 108885263 | 11/2018 |

(Continued)

OTHER PUBLICATIONS

Chinese Patent Office, Office Action mailed on Oct. 11, 2023, issued in connection with Chinese Patent Application No. 202080026481.7, 9 pages.

(Continued)

*Primary Examiner* — Yuqing Xiao
*Assistant Examiner* — Jempson Noel
(74) *Attorney, Agent, or Firm* — MCDONNELL BOEHNEN HULBERT & BERGHOFF LLP

(57) ABSTRACT

The present disclosure relates to light detection and ranging (LIDAR) devices and related methods of their use. An example LIDAR device includes a transmitter configured to transmit one or more light pulses into an environment of the LIDAR device via a transmit optical path. The LIDAR device also includes a detector configured to detect a first portion of the one or more transmitted light pulses and a
(Continued)

second portion of the one or more transmitted light pulses, such that the detector receives at a first time the first portion of the one or more transmitted light pulses via an internal optical path within the LIDAR device and receives at a second time the second portion of the one or more transmitted light pulses via reflection by one or more objects in the environment of the LIDAR device. The second time occurs after the first time.

20 Claims, 11 Drawing Sheets

(51) Int. Cl.
*G01S 7/4865* (2020.01)
*G01S 17/89* (2020.01)

(56) References Cited

U.S. PATENT DOCUMENTS

| | | | | |
|---|---|---|---|---|
| 9,383,753 | B1 * | 7/2016 | Templeton | G05D 1/0246 |
| 9,465,112 | B2 | 10/2016 | Stettner et al. | |
| 10,007,000 | B1 | 6/2018 | Droz et al. | |
| 10,340,651 | B1 * | 7/2019 | Drummer | H01S 3/094003 |
| 12,248,067 | B1 | 3/2025 | Droz et al. | |
| 2001/0012104 | A1 | 8/2001 | Dunne | |
| 2005/0200931 | A1 * | 9/2005 | Kawaguchi | G01S 7/4814 359/212.1 |
| 2006/0170903 | A1 | 8/2006 | Aburmad et al. | |
| 2009/0046272 | A1 | 2/2009 | Ohishi et al. | |
| 2010/0027602 | A1 * | 2/2010 | Abshire | H04L 25/4902 375/343 |
| 2016/0274589 | A1 * | 9/2016 | Templeton | G01S 17/86 |
| 2016/0282468 | A1 * | 9/2016 | Gruver | G01S 17/93 |
| 2016/0306032 | A1 | 10/2016 | Schwarz et al. | |
| 2017/0139041 | A1 * | 5/2017 | Drader | G01S 7/4863 |
| 2017/0146641 | A1 | 5/2017 | Walsh et al. | |
| 2017/0307738 | A1 | 10/2017 | Schwarz et al. | |
| 2017/0357260 | A1 | 12/2017 | Gilliland et al. | |
| 2018/0120433 | A1 * | 5/2018 | Eichenholz | G01S 17/26 |
| 2018/0188358 | A1 | 7/2018 | Li et al. | |
| 2018/0217242 | A1 | 8/2018 | Lombrozo et al. | |
| 2018/0224533 | A1 | 8/2018 | Dussan et al. | |
| 2018/0239001 | A1 * | 8/2018 | Dussan | G01S 7/4816 |
| 2018/0284231 | A1 | 10/2018 | Russell et al. | |
| 2019/0179028 | A1 * | 6/2019 | Pacala | G01S 17/42 |
| 2019/0293768 | A1 * | 9/2019 | Subasingha | G01S 7/4873 |
| 2020/0319311 | A1 * | 10/2020 | Hall | G01S 7/4815 |

FOREIGN PATENT DOCUMENTS

| | | | |
|---|---|---|---|
| JP | 2000-162307 | A | 6/2000 |
| JP | 2003-294414 | A | 10/2003 |
| JP | 2006-322917 | A | 11/2006 |
| JP | 2007051877 | | 3/2007 |
| JP | 2008111855 | | 5/2008 |
| JP | 2018-49014 | A | 3/2018 |

OTHER PUBLICATIONS

European Patent Office, Office Action mailed on Aug. 27, 2024, issued in connection with European Patent Application No. 20766679.3, 7 pages.

Israeli Patent Office, Office Action mailed on Sep. 29, 2024, issued in connection with Israeli Patent Application No. 286005, 4 pages.

European Patent Office, Partial Supplementary European Search Report mailed on Sep. 27, 2022, issued in connection with European Patent Application No. 20766679.3, 14 pages.

Japanese Patent Office, Office Action mailed on Sep. 7, 2022, issued in connection with Japanese Patent Application No. 2021552131, 10 pages (with English Translation).

International Searching Authority, International Search Report and Written Opinion mailed on Jun. 29, 2020, issued in connection with International Patent Application No. PCT/US2020/020936, filed on Mar. 4, 2020, 12 pages.

Japanese Patent Office, Office Action mailed on Mar. 14, 2023, issued in connection with Japanese Patent Application No. 2021552131, 7 pages (with English Translation).

* cited by examiner

SYSTEMS AND METHODS FOR REAL-TIME LIDAR RANGE CALIBRATION

CROSS-REFERENCE TO RELATED APPLICATIONS

This application is a national stage application under 35 U.S.C. § 371 of International Application No. PCT/US20/20936, filed Mar. 4, 2020, which claims the benefit of priority from U.S. Provisional Application No. 62/813,860, filed Mar. 5, 2019. The disclosures of all of the above applications are incorporated by reference herein in their entireties.

BACKGROUND

A conventional Light Detection and Ranging (LIDAR) system may utilize a light-emitting transmitter (e.g., a laser diode) to emit light pulses into an environment. Emitted light pulses that interact with (e.g., reflect from) objects in the environment can be received by a receiver (e.g., a photodetector) of the LIDAR system. Range information about the objects in the environment can be determined based on a time difference between an initial time when a light pulse is emitted and a subsequent time when the reflected light pulse is received.

SUMMARY

The present disclosure generally relates to optical systems (e.g., LIDAR systems) and certain aspects of their transmitter and receiver subsystems.

In a first aspect, a light detection and ranging (LIDAR) device is provided. The LIDAR device includes a transmitter configured to transmit a light pulse into an environment of the LIDAR device via a transmit optical path. The LIDAR device also includes a detector configured to detect a first portion of the transmitted light pulse and a second portion of the transmitted light pulse, such that the detector receives at a first time the first portion of the transmitted light pulse via an internal optical path within the LIDAR device and receives at a second time the second portion of the transmitted light pulse via reflection by an object in the environment of the LIDAR device. The second time occurs after the first time. The LIDAR device also includes a controller configured to determine a distance to the object based on a difference between the second time and the first time.

In a second aspect, a method is provided. The method includes causing a transmitter of a LIDAR device to transmit a first light pulse into an environment of the LIDAR device via a transmit optical path. The method also includes receiving, by a detector of the LIDAR device, a first portion of the first light pulse at a first time via an internal optical path within the LIDAR device and a second portion of the first light pulse at a second time via reflection by an object in the environment of the LIDAR device. Yet further, the method also includes determining a distance to the object based on a difference between the second time and the first time.

In a third aspect, a method is provided. The method includes positioning a mirror with respect to a transmitter of a LIDAR device. The transmitter is configured to transmit at least one light pulse. The method also includes causing the transmitter to transmit a first light pulse so as to interact with the mirror. Positioning the mirror is performed such that the first light pulse is directed toward an internal optical path within the LIDAR device. The method also includes receiving, by a detector of the LIDAR device, the first light pulse at a first time via the internal optical path. The method also includes determining a zero point time based on the first time.

Other aspects, embodiments, and implementations will become apparent to those of ordinary skill in the art by reading the following detailed description, with reference where appropriate to the accompanying drawings.

DETAILED DESCRIPTION

Figure 1:
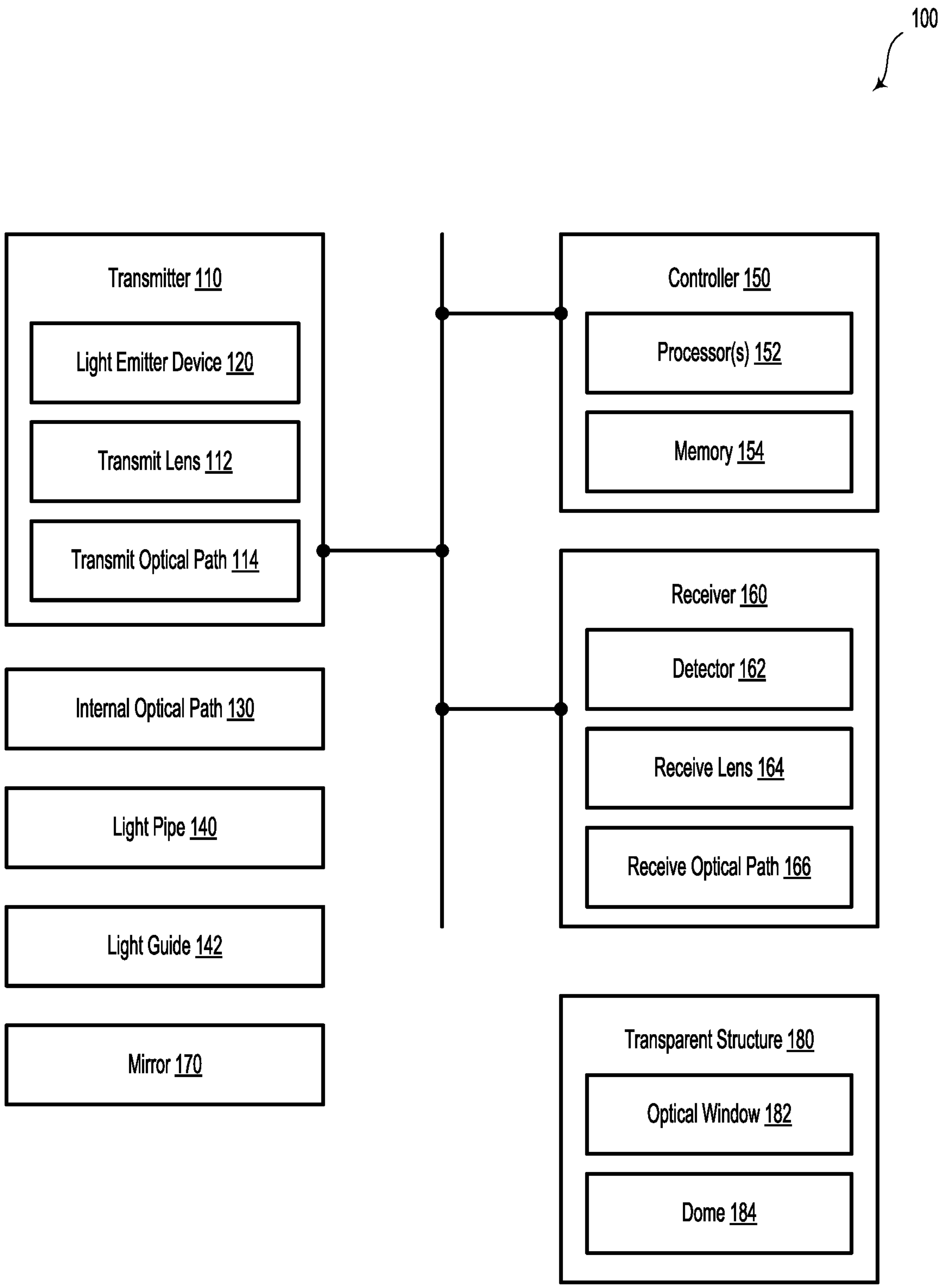
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A LIDAR system may obtain spatial range information about an environment by measuring a round-trip time between a first time (e.g., a time at which a light pulse is emitted) and a second time (e.g., a time at which the light pulse is received after interacting with the environment). However, establishing an absolute time reference for the first time (e.g., the time at which the light pulse is emitted from the LIDAR) can be challenging because there can be difficult to control or poorly controlled, time-varying delays (e.g., finite RC response times) of electronic components and/or data processing components. For example, there can be delays introduced between the time when a controller instructs a laser diode to fire and when the light pulse is actually emitted from the laser diode. Accordingly, to ensure accurate and repeatable range determinations in LIDAR systems, it is desirable to establish a "best-known" first time (e.g., time zero) when the light pulse is emitted.

In some embodiments, optical feedback, such as internal system reflections, can be beneficially utilized to determine the actual firing time of the light pulse. That is, at the time of firing the light pulse, some portion of the light could be reflected, routed, or otherwise received by the LIDAR receiver. This portion of light is received almost instantaneously after being emitted from the laser diode. As such, "time zero" can be determined based on an initial signal from the receiver. Later, after the remaining portion of the light of the light pulse interacts with the environment, the second time could be defined by a subsequent signal from the receiver, indicating the round-trip time needed for light to travel out toward the environment and back to the LIDAR system. In such a scenario, the first time (e.g., time zero) could be subtracted from the second time to obtain the time delay from emission to signal reception, representing the true (or at least more-accurate) round-trip time.

In some embodiments, a LIDAR system could include a light pipe configured to "siphon" off a small amount of light from the light pulse (e.g., 0.001%-5% of the photons of the light pulse) and route (e.g., divert) them toward the receiver. The light pipe length could be relatively short (e.g., 0.1-10 cm) with respect to the distance to a given object in the environment (e.g., 1-100 m). Accordingly, the light from the light pipe could represent a near-ideal time zero reference.

In other embodiments, a LIDAR system could include a dome or window structure. In such scenarios, at least a portion of the light pulses could be reflected (directly or indirectly) from an interior surface of the dome or window. These reflections can be utilized to find the time zero reference.

It will be understood that LIDAR systems with other arrangements and/or components are possible and contemplated. For example, a LIDAR system could include one or more light-emitter devices configured to emit light toward an environment of the LIDAR system via one or more optical elements. In some embodiments, the optical elements could include a fast-axis collimation (FAC) lens and/or a shared lens. In some embodiments, the shared lens may be configured to direct light toward the environment as well as focus incident light onto one or more photodetectors of the LIDAR system. In some embodiments, the optical elements could additionally or alternatively include a planar waveguiding structure and/or a light guide manifold.

In alternative examples, a LIDAR with a rotating mirror (e.g., three- or four-sided reflective prism) could direct light pulses toward an environment in a scanning fashion. In such scenarios, at least a portion of the light from the light pulses could be reflected from the rotating mirror back toward the receiver. For example, when the light pulse interacts with a surface of the rotating mirror, a portion of the photons could be reflected back toward the receiver, either directly or by way of stray light reflections. Additionally or alternatively, when a reflective surface of the rotating mirror is perpendicular to the emission axis of the laser diode(s), at least some of the photons could be directed back toward the receiver. In such scenarios, the time zero reference could be obtained based on the portion of photons received by the receiver.

In some embodiments, a LIDAR may include a plurality of light emitters configured to emit light pulses into a plurality of optical waveguide channels in a lightguide manifold. The waveguide channels in the lightguide manifold could be configured to route the light pulses toward a plurality of output mirrors by total internal reflection. The output mirrors are configured to direct the respective light pulses out of the plane of the light guide manifold (and out of the optical waveguides) and toward an environment of the LIDAR. In such a scenario, some of the light from the light pulses may "spill" into the light guide manifold. Such light could be received by one or more detectors in the receive path. For example, the one or more detectors could be optically coupled to the light guide manifold. In such examples, the portion of light from the light pulses could be used to determine the time zero reference.

Furthermore, in some embodiments, based on various firing schedules, such a LIDAR system could emit light pulses from the plurality of light emitters at the same time or in very quick succession (e.g., firing within several nanoseconds of one another). In order to assist with disambiguating the portion of light to use for a given time zero reference, in some firing schedules, individual channels could be fired at times that are independent of other channels. That is, laser diodes could be fired at temporally distinct times so as to distinguish light received from different transmit channels allowing a zero time reference to be established from a specific transmitter to a specific receiver. For example, discrete light emitters corresponding to individual transmitter channels could be fired at distinct times once every few normal firing cycles, predetermined times, or on demand.

II. Example Optical Systems

FIG. 1 illustrates an optical system 100, according to an example embodiment. The optical system 100 could include a light detection and ranging (LIDAR) device. The optical system 100 includes a transmitter 110 configured to transmit light pulses into an environment of the LIDAR device via a transmit optical path 114. The light pulses could be emitted by a light emitter device 120. The light emitter device 120 could be configured to emit emission light (e.g., infrared light pulses). In some embodiments, the light emitter device 120 could include a laser diode (which could be made up of a plurality of laser diode bars).

The optical system 100 also includes a receiver 160. In various embodiments, the optical system 100 could include a transmit lens 112 and a receive lens 164 disposed along the transmit optical path 114 and a receive optical path 166, respectively. The receiver 160 includes a detector 162 configured to detect a first portion of the transmitted light pulse and a second portion of the transmitted light pulse, such that the detector 162 receives at a first time the first portion of the transmitted light pulse via an internal optical path 130 within the optical system 100 and receives at a second time the second portion of the transmitted light pulse via reflection by an object in the environment of the optical system 100. The second time occurs after the first time. For example, the second time could be 33 ns after the first time. In such a scenario, based on the speed of light, the second portion of the transmitted light pulse can be determined to have traveled 10 m further than the first portion of the transmitted light pulse. Accordingly, an object could be determined to be about 5 m away from the optical system along the transmit optical path 114 of the transmitted light pulse.

In some embodiments, the detector 162 could include at least one of: a silicon photomultiplier (SiPM) device, a single photon avalanche photodiode (SPAD), an avalanche photodiode (APD), or a multi-pixel photon counter (MPPC). It will be understood that other types of photodetector devices are possible and contemplated.

The optical system 100 also includes a controller 150. The controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other types of memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of optical system 100. As such, the memory 154 may include program instructions to perform or facilitate some or all of the functionality described herein. The controller 150 is configured to carry out operations. In some embodiments, controller 150 may carry out the operations by way of the processor 152 executing instructions stored in the memory 154.

The operations could include operating various elements of optical system 100 to obtain range information about an environment of the optical system 100. For example, the controller 150 could be configured to determine a distance to an object in the environment of the optical system 100 based on a difference between the second time and the first time. The controller 150 could be configured to carry out other operations as well, such as those that relate to methods 600 and 700, as illustrated and described in relation to FIGS. 6 and 7. For example, the controller 150 could be configured to add or subtract a constant offset time. The constant offset time could correspond to an offset distance computed by subtracting the difference between the second time and the first time from the total transit time to and from the object. In some embodiments, the offset distance could correspond to the time for light to travel along the distance of the internal optical path 130. Other constant offset times are possible and contemplated.

In some embodiments, the optical system 100 could include a light pipe 140 within the optical system 100. In such scenarios, the internal optical path 130 could include an optical path that extends through the light pipe 140. The light pipe 140 could include, for example, an opening between the transmitter 110 and receiver 160 portions of the optical system 100. Such an opening could allow a portion of the transmitted light pulse to "short cut" through the opening so as to be received by the detector 162 before light from the reflected light pulse is received.

In some embodiments, the light pipe 140 is configured to receive a predetermined percentage of the photons in the transmitted light pulse. For example, the light pipe 140 could be positioned, sized, or otherwise selected so as to receive 0.00001%, 0.1%, 1%, 10%, or another predetermined percentage of the photons in the transmitted light pulse. Additionally or alternatively, the predetermined percentage could be less than 1 percent or less than 10 percent of the photons of the transmitted light pulse. Other predetermined percentages of the transmitted light pulse are possible and contemplated within the context of the present disclosure.

In various example embodiments, the internal optical path 130 could include reflection of a portion of the transmitted light pulse by one or more components of the optical system 100.

Additionally or alternatively, the optical system 100 could include a transparent structure 180. For example, the transparent structure 180 could include an optical window 182 and/or a dome 184 configured to be mounted on a vehicle (e.g., vehicle 500 as illustrated and described in relation to FIGS. 5A-5E). In such scenarios, the transmit optical path 114 passes through the transparent structure 180 and the internal optical path 130 includes reflection of at least a portion of the transmitted light pulse by the transparent structure 180.

In some embodiments, the optical system 100 could include a mirror 170. In such scenarios, the transmit optical path 114 includes reflection by the mirror 170. Furthermore, in such cases, the internal optical path 130 includes reflection of at least a portion of the transmitted light pulse by the mirror 170.

In some examples, the optical system 100 could include a light guide 142 configured to guide light by total internal reflection from an input end to an output end. In such scenarios, the transmit optical path 114 includes a first optical path that extends from the input end of the light guide 142 to the output end of the light guide 142. The internal optical path 130 includes the first optical path and also includes a second optical path that extends from the input end of the light guide 142 to the output end of the light guide 142 further to the detector 162.

In embodiments that include a light guide 142, the output end of the light guide 142 could include a mirror 170.

Figure 2A:
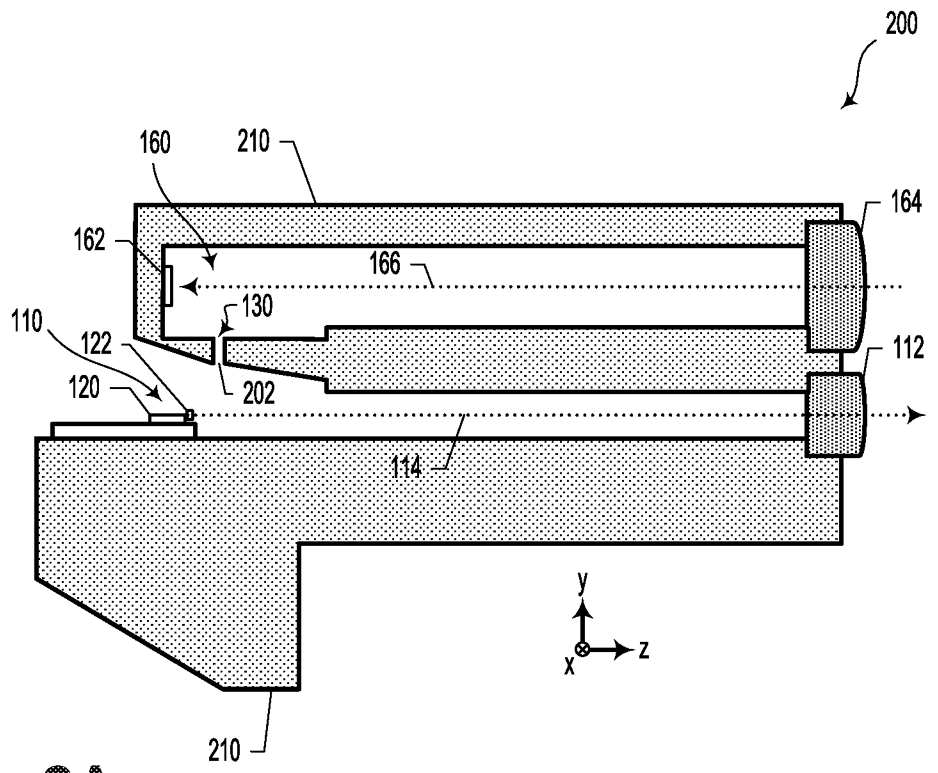
FIG. 2A illustrates a transceiver, according to an example embodiment.
Figure 2B:
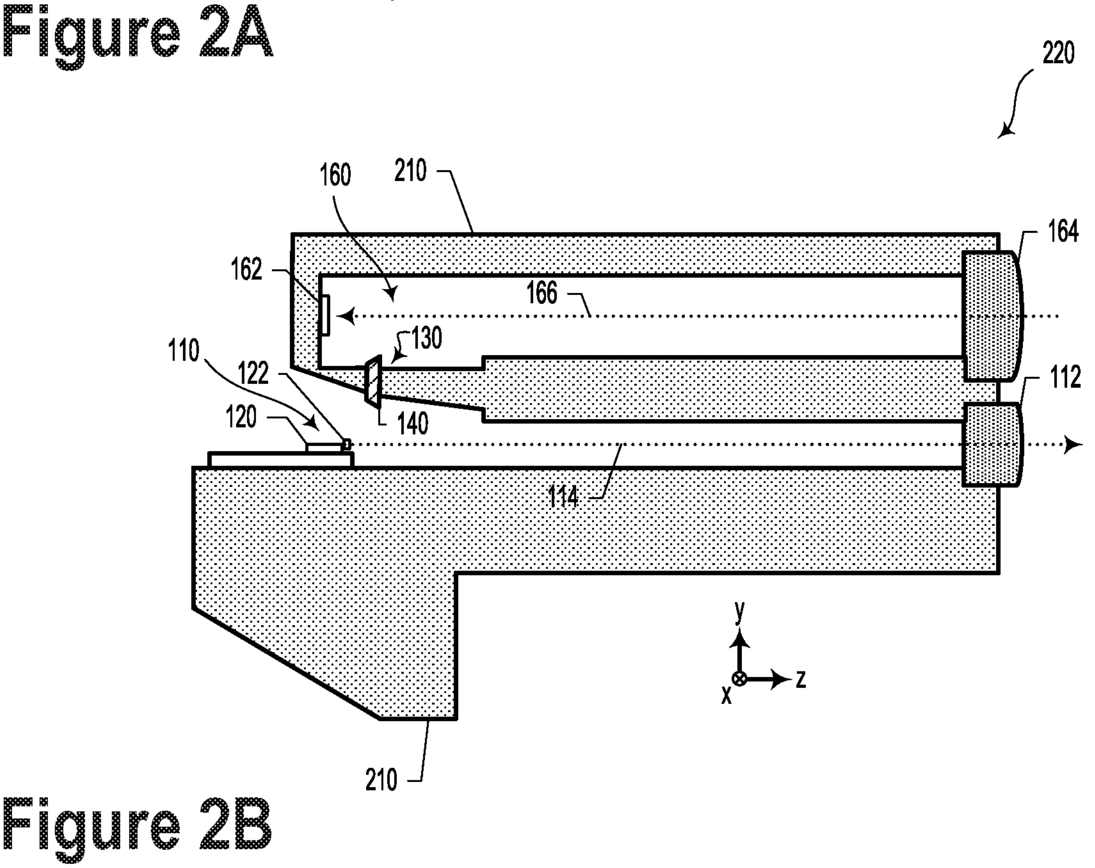
FIG. 2B illustrates a transceiver, according to an example embodiment.
Figure 2C:
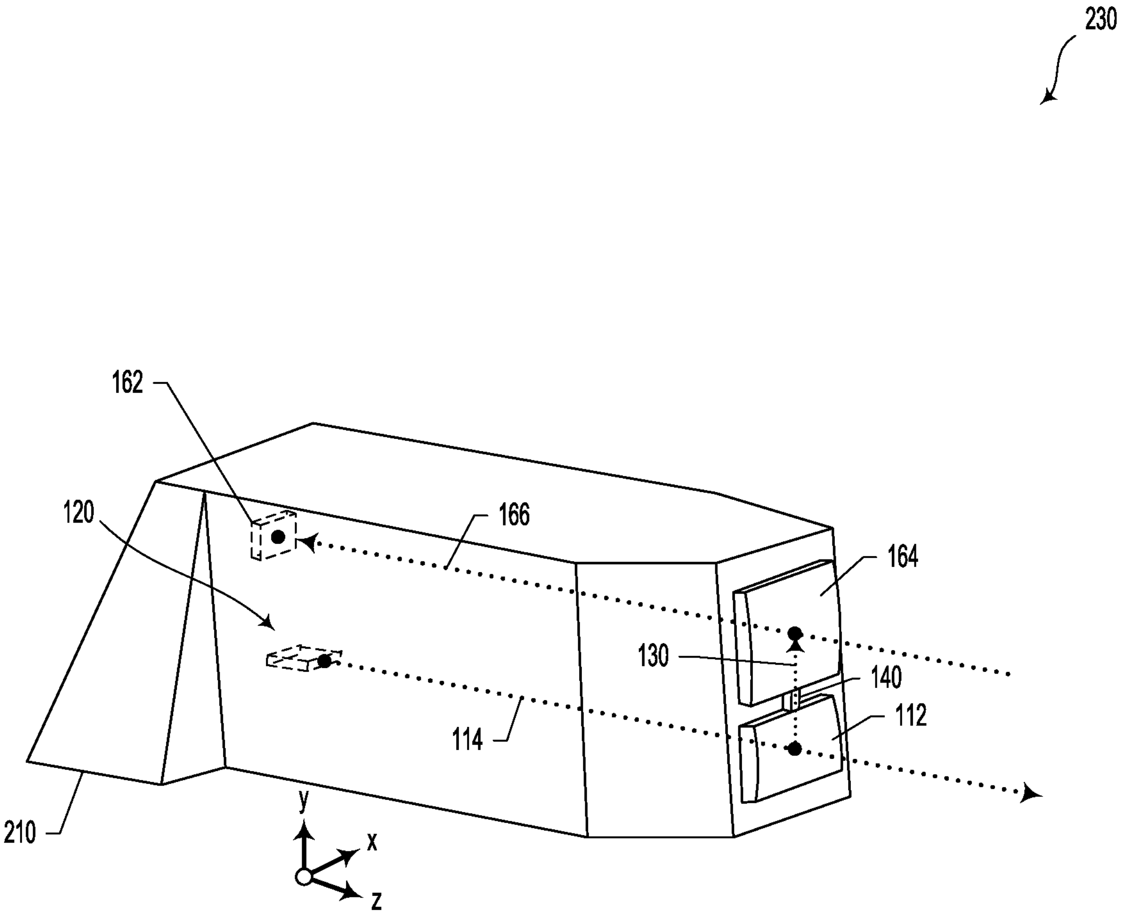
FIG. 2C illustrates a transceiver, according to an example embodiment.

FIGS. 2A, 2B, and 2C illustrate transceivers 200, 220, and 230, according to example embodiments. Transceivers 200, 220, and/or 230 could include similar elements to optical system 100, as illustrated and described in relation to FIG. 1. Transceivers 200, 220, and/or 230 could include a transmitter and/or receiver portion of a LIDAR system.

In reference to FIG. 2A, transceiver 200 could include a housing 210. The transceiver 200 could also include a transmitter 110 and corresponding light emitter device 120 coupled to the housing 210. In some embodiments, the transmitter 110 may include a fast-axis collimation (FAC) lens 122, which may be optically coupled to the light emitter device 120. The transmitter may be configured to emit light pulses along the transmit optical path 114. Such light pulses may be transmitted into an environment of the transceiver 200 by way of the transmit lens 112.

In some embodiments, the FAC lens 122 could include a cylindrical lens. However, other optical elements (e.g., molded lenses) are contemplated and possible within the context of the present disclosure.

The transceiver 200 also includes a receiver 160. The receiver 160 includes a detector 162 that is optically coupled to a receive lens 164. As described elsewhere herein, the detector 162 could be a SiPM or another type of photodetector or photodetector array. The receiver 160 could be configured to receive light from an environment of the system along the receive optical path 166.

In some embodiments, the housing 210 could include an opening 202 disposed between the receiver 160 and the transmitter 110. The opening 202 could be located, shaped, sized, and/or otherwise configured to transmit a portion of the light emitted by the light emitter device 120 along an internal optical path 130 toward the receiver 160 and the detector 162.

FIG. 2B illustrates a transceiver 220, according to an example embodiment. Transceiver 220 could be similar in some respects to transceiver 220 as illustrated and described in reference to FIG. 2A. However, transceiver 220 could additionally or alternatively include a light pipe 140 along at least a portion of the internal optical path 130. The light pipe 140 could include an optical fiber, a light guide, an optical waveguide, or another structure configured to route light from a first location (e.g., the transmit optical path 114) to a second location (e.g., the receive optical path 166).

While FIG. 2B illustrates the light pipe 140 as providing a substantially straight path from the transmitter 110 to the receive optical path 166, it will be understood that the light pipe 140 could be curved and/or include one or more branches.

In some embodiments, the light pipe might 140 may extend beyond the leakage path to explicitly capture some of the light. In other embodiments, the light pipe 140 may include one or more facets configured to collect light from the transmit optical path 114 and/or provide light to the receiver 160. It will be understood that other optical configurations are possible and contemplated. In some embodiments, the light pipe 140 might not fill the entire opening 202 between the transmitter and receiver portions of the system. In such a scenario, the light pipe 140 may be configured to utilize total internal reflection.

FIG. 2C illustrates a transceiver 230, according to an example embodiment. Transceiver 230 could be similar to transceivers 200 and 220, as illustrated and described in relation to FIGS. 2A and 2B. In some embodiments, transceiver 230 could include a light pipe 140 that may guide at least a portion of the light emitted along the transmit optical path 114 toward the receive optical path 166. For example, an optical fiber could be optically coupled between the transmit lens 112 and the receive lens 164. In other embodiments, the transmit lens 112 and the receive lens 164 could be physically joined, and possibly molded from the same material. Other ways to optically couple the transmit lens 112 and the receive lens 164 are possible and contemplated.

In such scenarios, light pulses emitted from the light emitter device 120 along the transmit optical path 114 could interact with transmit lens 112 and could be partially guided via light pipe 140 toward the receive lens 164. A portion of the light coupled into the receive lens 164 may be diverted to the detector 162. Such a portion of light could be, for instance, within a range between one part per million (0.000001) to one part per trillion (0.000000000001). For example, between 0.00001% and 5% of the photons of a given light pulse may be diverted by way of the light pipe 140 to the detector 162. Other portions of light are possible and contemplated within the context of the present disclosure.

Figure 3A:
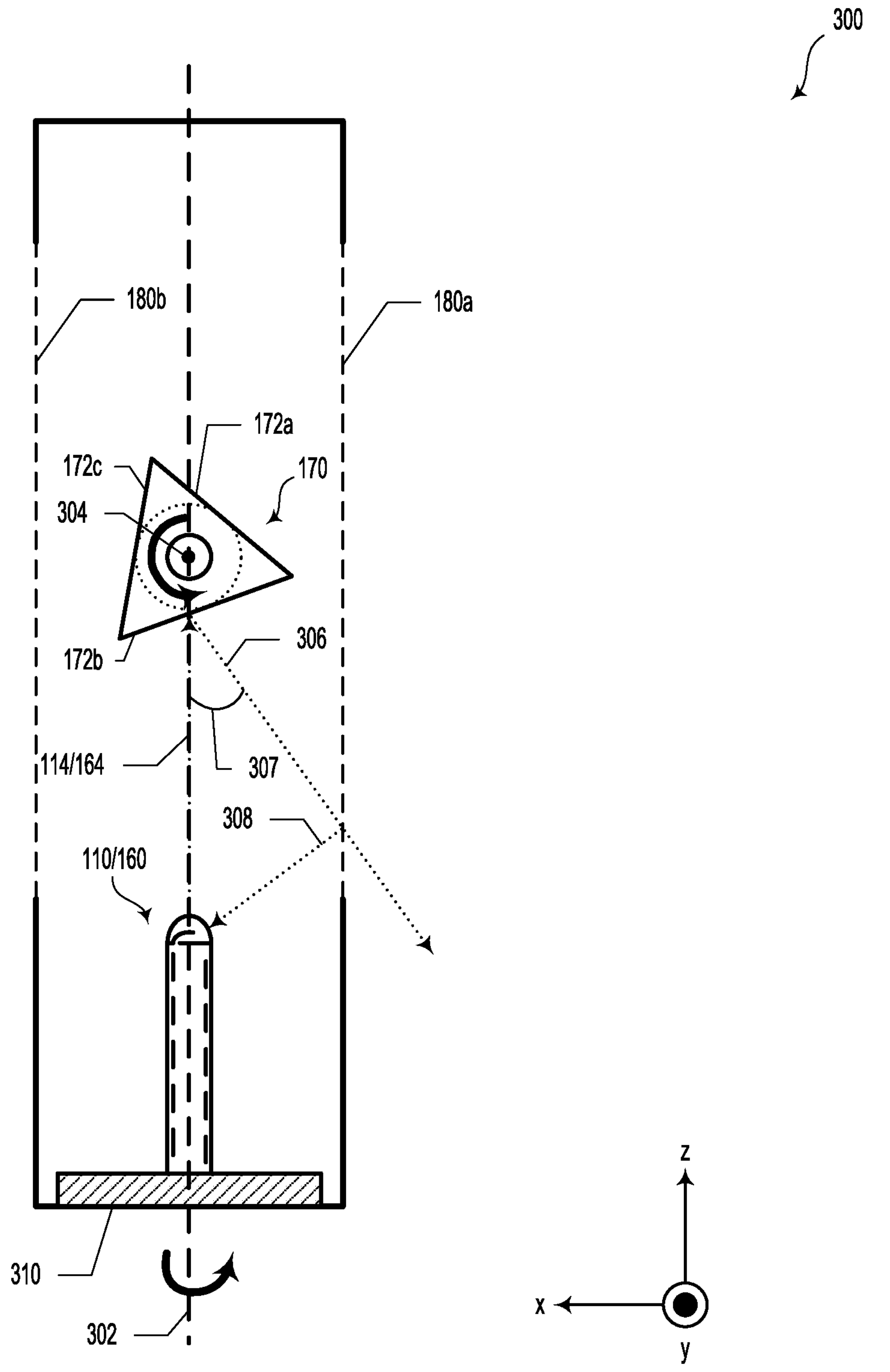
FIG. 3A illustrates a side view of an optical system, according to an example embodiment.
Figure 3B:
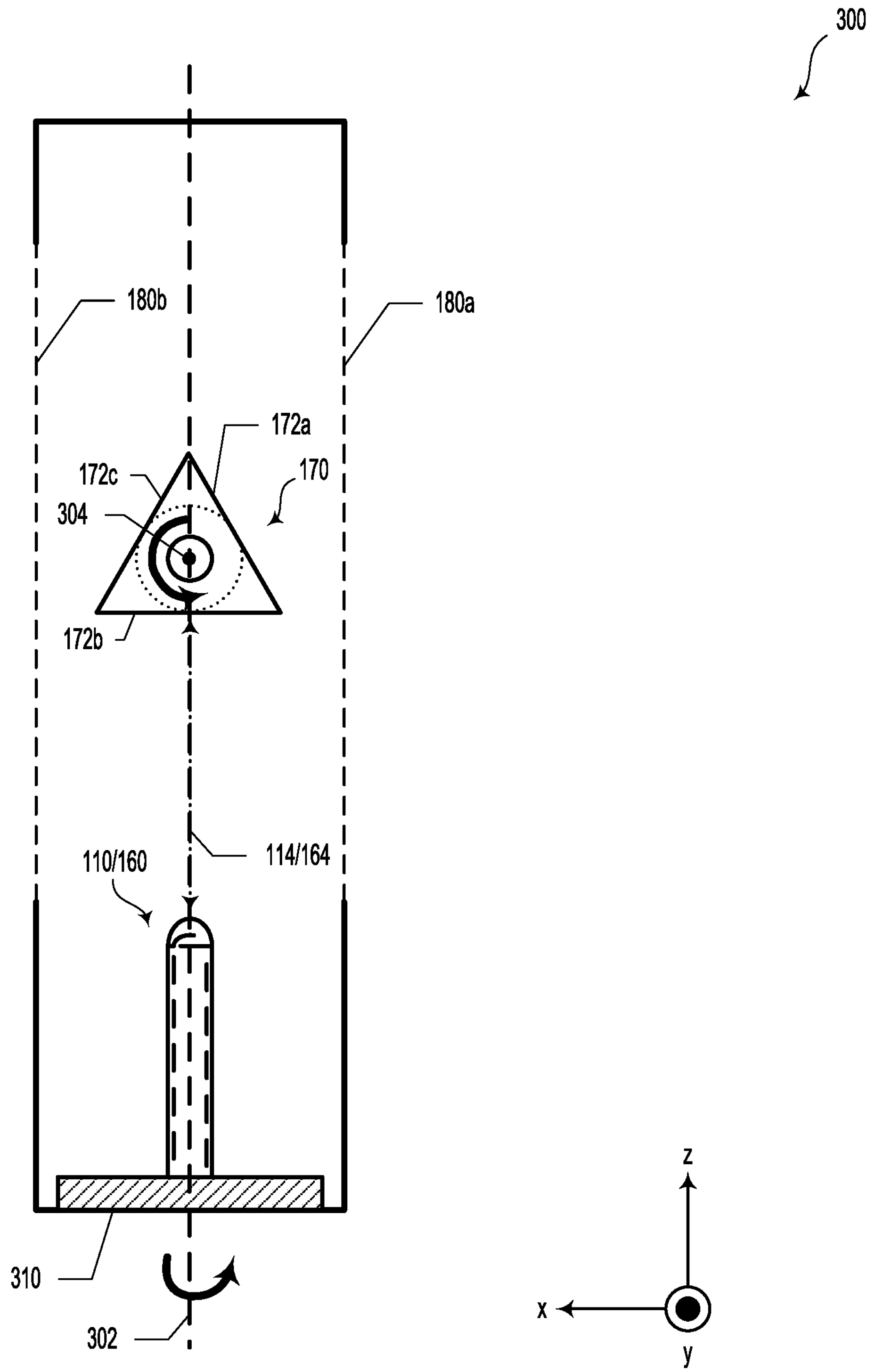
FIG. 3B illustrates a side view of an optical system, according to an example embodiment.

FIGS. 3A and 3B illustrate side views of an optical system 300, according to example embodiments. The optical system 300 could be similar to optical system 100 as illustrated and described in reference to FIG. 1. For example, optical system 300 could include transmitter 110 and receiver 160, which could be mounted to a rotatable stage 310. The rotatable stage 310 could be configured to rotate about an axis of rotation 302. In some embodiments, the rotatable stage 310 could be actuated by a stepper motor or another device configured to mechanically rotate the rotatable stage 310.

In some embodiments, the optical system 300 could include a rotatable mirror 170. The rotatable mirror 170 could be shaped like a triangular or rectangular prism and could be configured to rotate about a rotational axis 304. The rotatable mirror 170 could include a plurality of reflective surfaces 172*a*, 172*b*, and 172*c*.

Additionally or alternatively, the optical system 300 could include optical windows 180*a* and 180*b*. The reflective surfaces 172*a-c* could be configured to reflect light pulses emitted by the optical system 100 along transmit optical path 114. For example, the light pulses could be reflected toward an environment of the optical system 300 by way of the optical windows 180*a* and 180*b*. Furthermore, reflected light pulses from the environment could be reflected from the reflective surfaces 172*a-c* along receive optical path 166.

In such a fashion, optical system 400 could be configured to emit light pulses into, and receive reflected light pulses from, a 360-degree region of the environment (e.g., about the z-axis). Accordingly, the optical system 400 could be configured to determine range information based on the time-of-flight of the respective reflected light pulses.

Referring to FIG. 3A, the rotatable mirror 170 could be rotated at an angle so as to reflect light along a primary reflection path 306 that corresponds to a primary elevation angle 307. In some embodiments, at least a portion of the light emitted along the primary reflection path 306 could be reflected by the optical window 180*a* so as to reflect the portion of light along a secondary reflection path 308. At least some of the portion of light along the secondary reflection path 308 could be received by the receiver 160 (e.g., by the detector 162). FIG. 3A illustrates just one possible configuration for the rotatable mirror 170 and other multi-path reflections of light back to the detector 162 are possible and contemplated.

Referring to FIG. 3B, in some embodiments, the rotatable mirror 170 could be rotated so as to reflect light directly back to the receiver 160. Namely, the rotatable mirror 170 could be positioned so that a reflective surface (e.g., reflective surface 172*b*) reflects at least a portion of light toward the receiver 160 and detector 162. That is, the reflective surface 172*b* could be positioned so that it is substantially perpendicular (e.g., normal) with respect to the transmit optical path 114. In some embodiments, the rotatable mirror 170 could be rotated so as to reflect light toward a light pipe 140. The portion of light reflected back toward the receiver 160 (either by direct reflection from the reflective surface 172*b* and/or via the light pipe 140) could be detected by the detector 162. The corresponding signal could be used as the first time, $t_1$. Similar to transceiver 200, the first time could be utilized to determine a transit path length based on subsequent pulse times.

Figure 4:
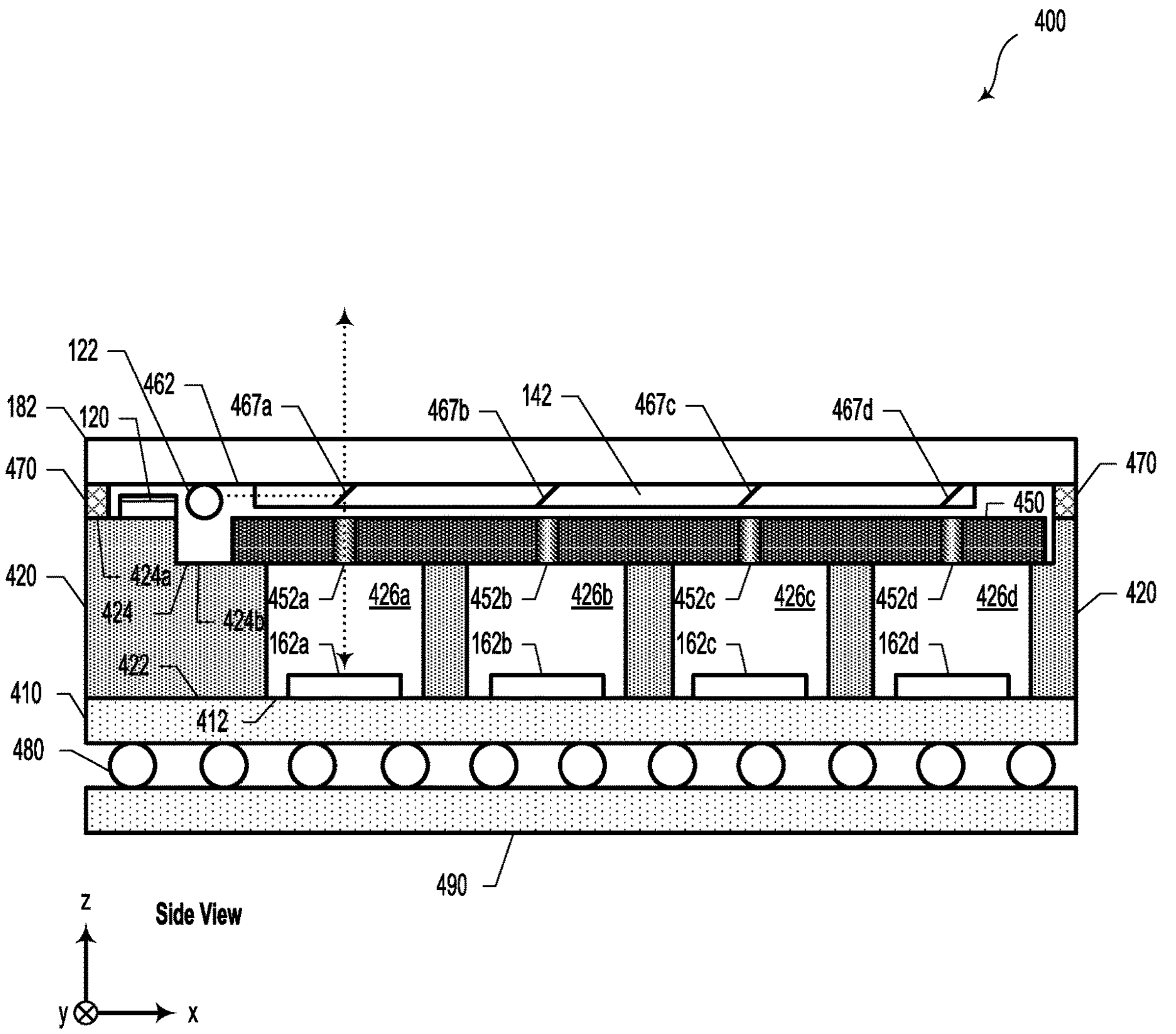
FIG. 4 illustrates an optical system, according to an example embodiment.
Figure 5A:
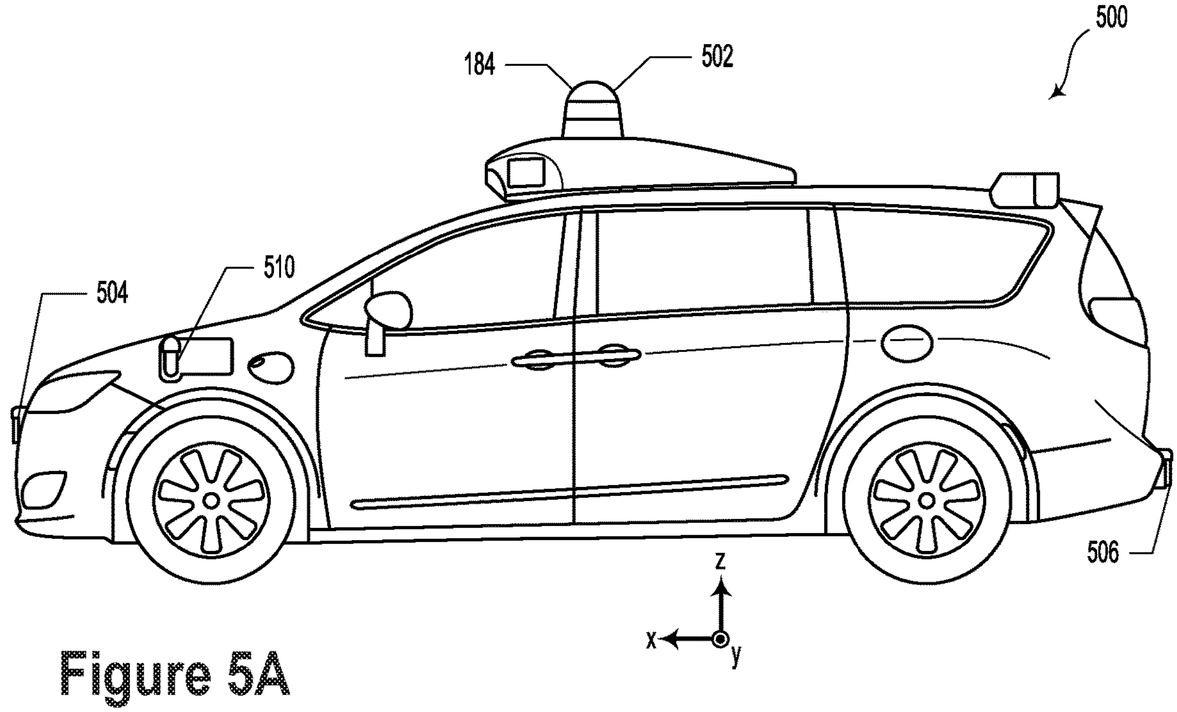
FIG. 5A illustrates a vehicle, according to an example embodiment.
Figure 5B:
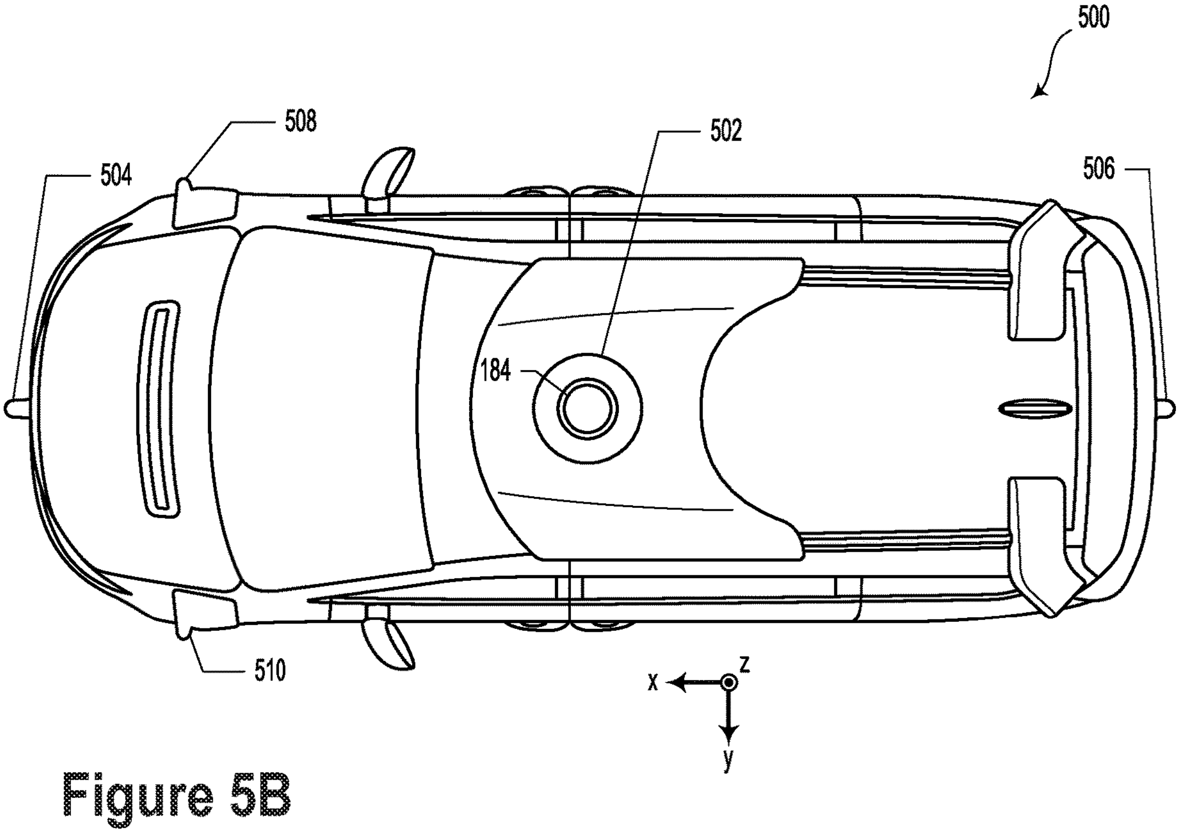
FIG. 5B illustrates a vehicle, according to an example embodiment.
Figure 5C:
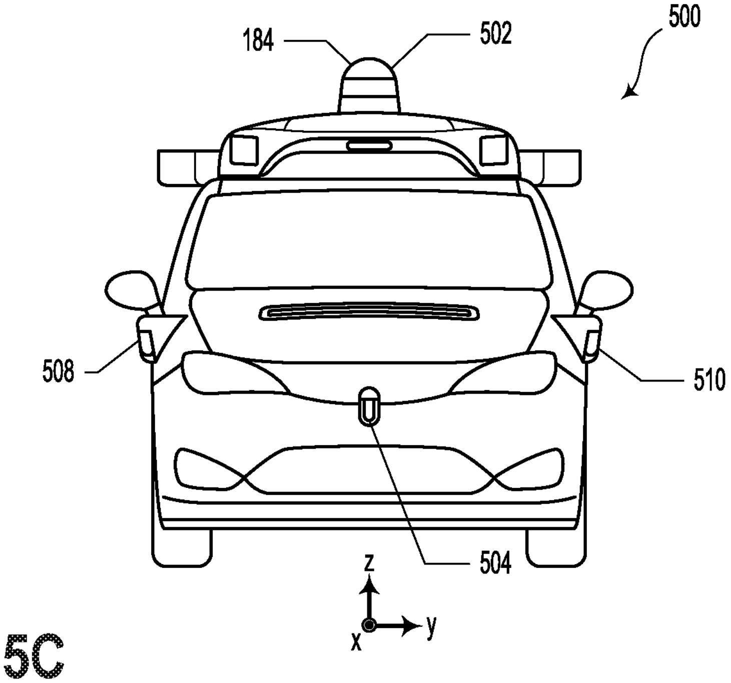
FIG. 5C illustrates a vehicle, according to an example embodiment.
Figure 5D:
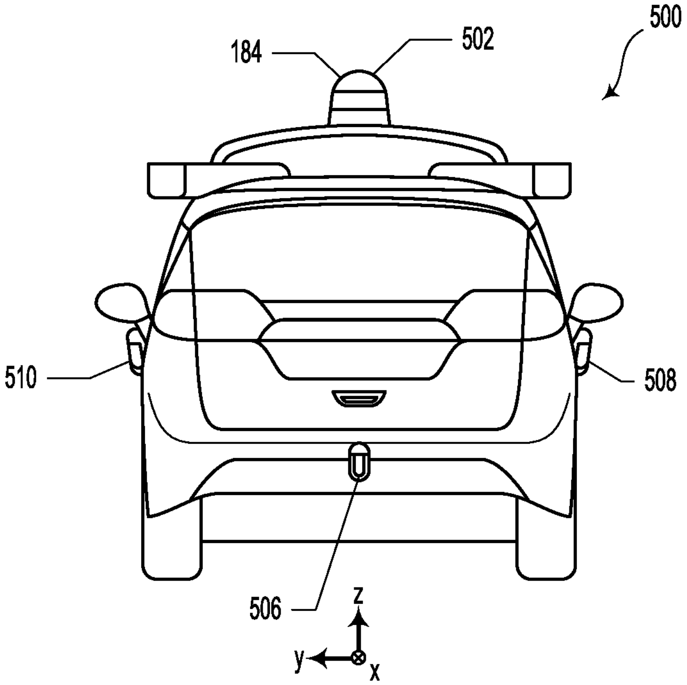
FIG. 5D illustrates a vehicle, according to an example embodiment.
Figure 5E:
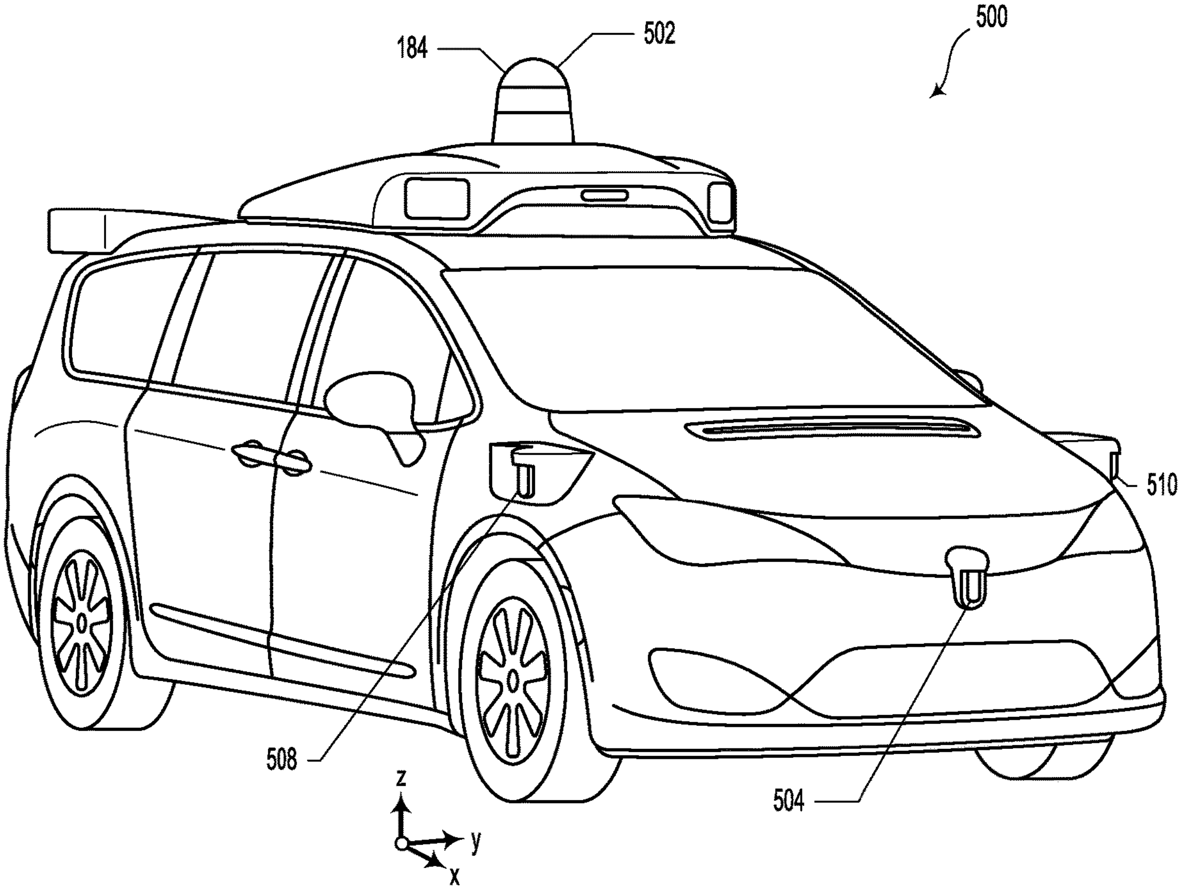
FIG. 5E illustrates a vehicle, according to an example embodiment.

FIG. 4 illustrates a cross-sectional view of an optical system 400, according to an example embodiment. FIG. 4 could include elements that are similar or identical to those of optical system 100 illustrated and described in reference to FIG. 1.

For example, in some embodiments, the optical system 100 could include a light emitter device 120, detectors 162*a*-162*d*, and an optical window 182. The optical system 400 could include a spacer structure 420 having a first surface 422 and a second surface 424. The spacer structure 420 could also include cavities 426*a*-426*d* extending through the spacer structure 420.

One or more light emitter devices 120 could be coupled to the second surface 424 of the spacer structure 420. The light emitter devices 120 could each include one or more light-emitting regions. As illustrated in FIG. 4, the second surface 424 could include an upper portion 424*a* and a lower portion 424*b*. For example, the upper portion 424*a* could define a first plane and the lower portion 424*b* could define a second plane. Thus, in some embodiments, the second surface 424 could include an upper portion 424*a* that "steps down" to a lower portion 424*b*.

In some embodiments, the detectors 162*a*-162*d* could be disposed within the cavities 426*a*-426*d*. For example, as illustrated, each cavity could include one detector device. Alternatively, multiple detector devices and/or detector arrays could be disposed in a single cavity. The detectors 162*a*-162*d* could be configured to detect the light emitted by the one or more light emitter devices 120 after interaction with the external environment.

As additionally illustrated in FIG. 4, an intermediate lid 450 could be coupled to the second surface 424 (e.g., the lower surface 424*b*) of the spacer structure 420. In embodiments, the intermediate lid 450 could include a plurality of apertures 452*a*-452*d*, which could be aligned with the cavities 426*a*-426*d*, respectively. In some embodiments, the apertures 452*a*-452*d* could have a diameter of 150 microns. However, other aperture diameters are possible and contemplated.

In some embodiments, the plurality of apertures 452*a*-452*d* could include holes drilled or lithographically etched through a material that is substantially opaque to light emitted by the light emitter devices 120. In other embodiments, the plurality of apertures 452*a*-452*d* could include optical windows that are substantially transparent to light emitted by the light emitter devices 120.

While FIG. 4 illustrates the intermediate lid 450 as including the plurality of apertures 452*a*-452*d*, it will be understood that in some embodiments, the plurality of apertures 452*a*-452*d* could be formed in the spacer structure 420. For example, the spacer structure 420 could include one or more holes forming the plurality of apertures 452*a*-452*d*. In one example embodiment, plurality of apertures 452*a*-452*d* could be formed between the upper portion 424*a* and the lower portion 424*b* of the spacer structure 420.

FIG. 4 also illustrates an optical window 182 that includes a mounting surface 462. In some embodiments, the optical window 182 could be substantially transparent to light emitted by light emitter device 120. At least one FAC lens 122 could be coupled to the mounting surface 462 of the optical window 182. Furthermore, at least one light guide 142 is coupled to the mounting surface 462 of the optical window 182. In embodiments, the at least one light guide 142 could include reflective surfaces 467*a*-467*d* (e.g., mirrored facets).

In some examples, a shim 470 could be disposed between the upper portion 424*a* of the spacer structure 420 and the mounting surface 462 of the optical window 182. The shim 470 could be selected such that a light emitter device 120 is disposed at a predetermined or desired position with respect to the at least one FAC lens 122 and/or the at least one light guide 142. For example, the shim 470 could be selected so that light emitted from the light emitter device 120 is efficiently collected by the at least one FAC lens 122 and efficiently coupled into the at least one light guide 142.

While FIG. 2 illustrates shim 470 as being located near the sides of the optical system 400, it will be understood that the shim 470 could be located elsewhere. For example, shim 470 could be disposed between the intermediate lid 450 and the mounting surface 462 of the optical window 182. Additionally or alternatively, shim 470 could be present in other regions of the optical system 100, for example, to provide a baffle (e.g., to prevent stray light propagation).

The optical system 400 could additionally include a circuit board 490 that could be physically coupled to the first substrate 410 by way of controlled-collapse solder balls 480. Other ways to physically and/or electrically connect the first substrate 410 to the circuit board 490 are possible and contemplated, such as, without limitation, conventional solder balls, ball-grid arrays (BGA), land-grid arrays (LGA), conductive paste, and other types of physical and electrical sockets.

In some embodiments, the reflective surfaces 467*a*-467*d* could be configured to direct light primarily in the +z direction toward an environment of the optical system 400. Additionally or alternatively, at least portion of the reflective surfaces 467*a*-467*d* could be configured to direct at least a portion of the emitted light in the −z direction (e.g., toward the respective detectors 162*a*-162*d*). In other words, a first portion of each light pulse could be provided directly to the detectors 162*a*-162*d* and a second portion of each light pulse could be directed toward an environment of the optical system 400. In such scenarios, the first time, $t_1$, could be determined based on an arrival time of the first portion of light at the detectors 162*a*-162*d*. Furthermore, the second time, $t_2$, could be determined based on an arrival time of a reflected portion of the second portion of light at the detectors 162*a*-162*d*. It will be understood that in some embodiments, stray light (e.g., due to direct or diffuse reflections within the optical system 400) could be utilized to determine the first time, $t_1$.

Other ways to determine a zero point time and/or receive a temporal reference signal within the context of this disclosure are contemplated. For example, the zero point time, to, or another temporal reference signal may be determined based on direct and/or multi-path reflections of light pulses from the reflective surfaces 467*a*-467*d*, the light guide 142, the optical window 182, and/or other portions of the optical system 400.

III. Example Vehicles

FIGS. 5A, 5B, 5C, 5D, and 5E illustrate a vehicle 500, according to an example embodiment. The vehicle 500 could be a semi- or fully-autonomous vehicle. While FIGS. 5A-5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In an example embodiment, one or more of the sensor systems 502, 504, 506, 508, and 510 could include the optical system 100 as illustrated and described in relation to FIG. 1. For example, in such scenarios, sensor systems 502, 504, 506, 508, and 510 could include LIDAR sensors having a plurality of light-emitter devices arranged over a range of angles with respect to a given plane (e.g., the x-y plane).

One or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

An example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle 500.

While LIDAR systems with multiple light-emitter devices are described and illustrated herein, LIDAR systems with fewer light-emitter devices (e.g., a single light-emitter device) are also contemplated. For example, light pulses emitted by a laser diode may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIG. 5 illustrates various LIDAR sensors attached to the vehicle 500, it will be understood that the vehicle 500 could incorporate other types of sensors, such as a plurality of optical systems, as described herein. Additionally or alternatively, it will be recognized that, in some embodiments, one possible source of calibration light pulses could include light that is reflected from a surface at a known distance from the LIDAR system. As an example, light pulses reflected off of a side mirror or another surface of the vehicle 500 could be utilized to determine $t_1$ or another time reference so as to more accurately calculate the range of light pulses that are reflected back to the LIDAR system from elsewhere within the environment of the vehicle 500.

IV. Example Methods

Figure 6:
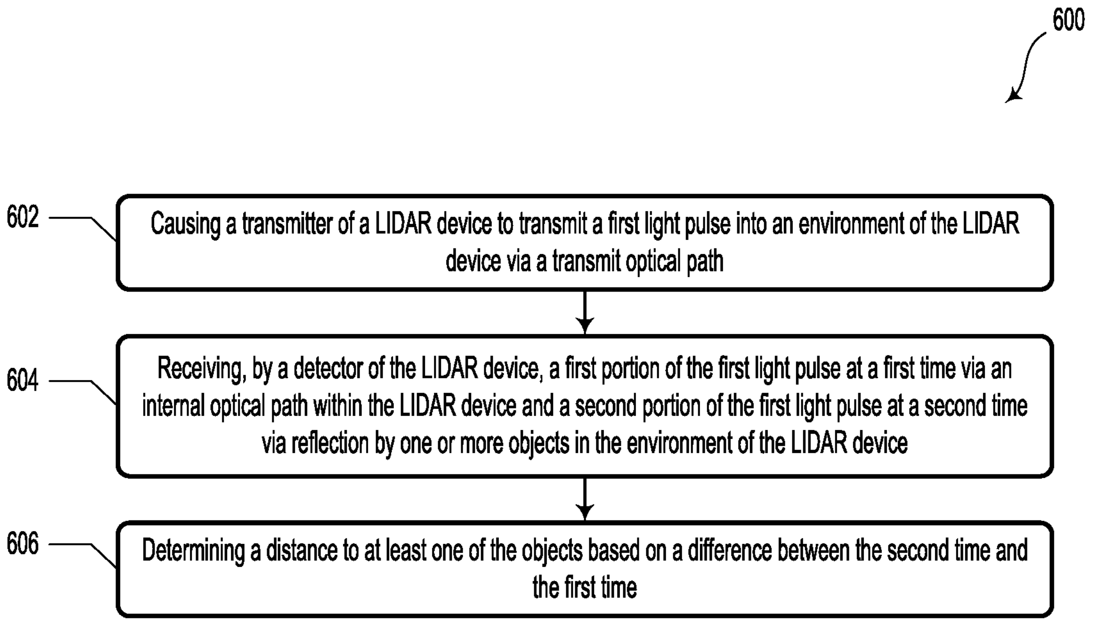
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may be carried out by controller 150 and/or other elements of optical system 100 as illustrated and described in relation to FIG. 1. Additionally or alternatively, method 600 may be carried out with transceivers 200, 220, and/or 230 as illustrated and described in reference to FIGS. 2A, 2B, and 2C.

Block 602 includes causing a transmitter (e.g., transmitter 110) of a LIDAR device to transmit a first light pulse into an environment of the LIDAR device via a transmit optical path. The first light pulse could be, for example, an infrared light pulse emitted from a laser diode at an initial trigger time, to. Light pulses having other wavelengths are also possible and contemplated.

Block 604 includes receiving, by a detector (e.g., detector 162) of the LIDAR device, a first portion of the first light pulse at a first time, $t_1$, via an internal optical path (e.g., internal optical path 130) within the LIDAR device and a second portion of the first light pulse at a second time, $t_2$, via reflection by an object in the environment of the LIDAR device. In other words, a portion of the first light pulse could be reflected, routed, or otherwise redirected along the internal optical path so as to reach the detector at an earlier time than the remaining portion of the first light pulse. In some embodiments, due to the short transit path length (e.g., 10 cm, 1 cm, or less) of the internal optical path, the first portion of the first light pulse could reach the detector less than half a nanosecond (e.g., 0.33 ns) or less than 50 picoseconds (e.g., 33 ps) from its initial emission from the transmitter.

Block 606 includes determining a distance to the object based on a difference between the second time and the first time. By subtracting the first time from the second time, a transit time to and from an object in the environment may be approximated and/or determined. For example, for a first time, $t_1$=50 ps and a second time, $t_2$=33.38 ns, then $t_{diff}=t_2-t_1$=33.33 ns. Based on the speed of light (e.g., $3\times10^8$ m/s), the total transit distance may be approximately 10 meters. Accordingly, accounting for the outgoing and incoming portions of the transit distance, the object distance may be determined to be about half the total transit distance, 5 meters.

In some embodiments, method 600 may also include determining a zero point time (e.g., to) based on the first time. As an example, the zero point time could represent a temporal reference point from which one or more light pulse arrival times are compared to in an effort to determine range information. It will be understood that the zero point time may represent a temporal reference point that could be modified by (e.g., added to or subtracted by), for example, an additional constant offset time. The constant offset time could correspond to an offset distance computed by subtracting the zero distance from the target distance. For example, the offset distance time could correspond to the time that light travels along the internal path length distance or another type of adjustment distance.

In some embodiments, method 600 could additionally include causing the transmitter to transmit a subsequent plurality of light pulses via the transmit optical path. Each subsequent pulse is fired according to a predetermined light pulse schedule.

In such scenarios, method 600 may further include receiving, by the detector, subsequent reflected light pulses at subsequent times via reflection by an object in the environment of the LIDAR device. Furthermore, method 600 could include determining a distance to the object based on the respective subsequent times, the predetermined light pulse schedule, and the first time. For example, $t_1$ could be used as a time offset that is subtracted from subsequently received pulses. In such a manner, $t_1$ need only be measured once, periodically, or sporadically. Furthermore, the predetermined light pulse schedule could include a schedule for emitting a plurality of light pulses each emitted according to a respective $t_{delay}$ after to. That is, for a subsequent light pulse emitted at some time $t_{delay}$ after $t_0$, and where the reflected light pulse is received at time $t_3$, a total transit time could be calculated by: $t_{transit}=t_3-t_{delay}-t_1$.

Figure 7:
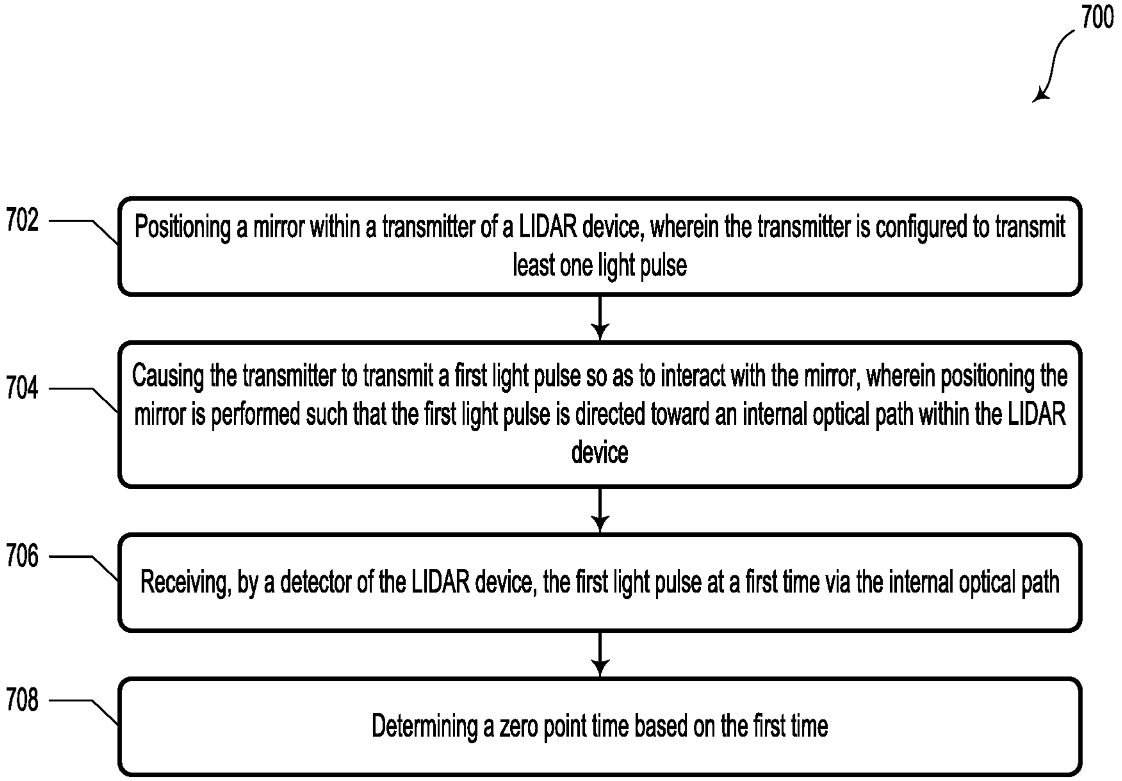
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may be carried out by controller 150 and/or other elements of optical system 100 as illustrated and described in relation to FIG. 1. Additionally or alternatively, method 700 may be carried out with optical systems 300 and/or 400 as illustrated and described in reference to FIGS. 3A, 3B, and 4.

Block 702 includes positioning a mirror (e.g., mirror 170) with respect to a transmitter (e.g., transmitter 110) of a LIDAR device. In such scenarios, the transmitter could be configured to transmit at least one light pulse. In reference to FIGS. 3A and 3B, positioning the mirror could include causing the mirror 170 to rotate about a rotational axis 304 to a desired position.

Block 704 includes causing the transmitter to transmit a first light pulse so as to interact with the mirror. Positioning the mirror is performed such that the first light pulse is directed toward an internal optical path (e.g., internal optical path 130) within the LIDAR device. As described elsewhere herein, the internal optical path could include, for example, a light pipe 140, a light guide 142, a mirror 170, an optical window 182, and/or a dome 184.

Block 706 includes receiving, by a detector (e.g., detector 162) of the LIDAR device, the first light pulse at a first time, $t_1$, via the internal optical path. As described in relation to optical systems 300 and 400, the first light pulse could be emitted toward the mirror and along the internal optical path so as to provide a temporal "reference pulse" from which subsequent pulse times could be calibrated, adjusted, and/or offset. In some embodiments, carrying out block 706 (e.g., obtaining light pulses via an internal optical path) could provide benefits on several fronts. First, some angles of the rotatable mirror will not produce reference pulses because substantially all of the light from a given light pulse may be diverted into the environment. Second, utilizing a portion of a light pulse that is reflected back from outside the LIDAR device may cause objects in the scene very close to the device to cause returns that are "mixed" with the feedback pulse, making the zero distance difficult or impossible to determine.

Block 708 includes determining a zero point time (e.g., to) based on the first time. As an example, the zero point time could represent a temporal reference point from which one or more light pulse arrival times are compared to in an effort to determine range information.

In some embodiments, method 700 could additionally include repositioning the mirror so as to direct subsequent light pulses via a transmit optical path into an environment of the LIDAR device. In such scenarios, the method 700 could include causing the transmitter to transmit a subsequent plurality of light pulses via the transmit optical path.

Method 700 could also include receiving, by the detector, subsequent reflected light pulses at subsequent times via reflection by an object in the environment of the LIDAR device.

Yet further, method 700 may include determining a distance to the object based on a difference between the respective subsequent times and the zero point time. In some embodiments, the subsequent light pulses could be fired according to a predetermined light pulse schedule. In such scenarios, determining the distance to the object could be further based on the predetermined light pulse schedule.

In example embodiments, the mirror could be a rotatable mirror. For example, the rotatable mirror could have a triangular prism shape. In such scenarios, the rotatable mirror could have three reflective surfaces corresponding to each of the three facets of the triangular prism. In some embodiments, the rotatable mirror could have a rectangular prism shape. In such scenarios, the rotatable mirror could include four reflective surfaces that correspond to each of the four main facets of the rectangular prism.

Additionally, positioning and repositioning the mirror could include causing a motor to rotate the rotatable mirror about a rotational axis so as to adjust respective angles of the three or four reflective surfaces.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The specification includes the following subject-matter, expressed in the form of clauses 1-20: 1. A light detection and ranging (LIDAR) device, comprising: a transmitter configured to transmit one or more light pulses into an environment of the LIDAR device via a transmit optical path; a detector configured to detect a first portion of the one or more transmitted light pulses and a second portion of the one or more transmitted light pulses, such that the detector receives at a first time the first portion of the one or more transmitted light pulses via an internal optical path within the LIDAR device and receives at a second time the second portion of the one or more transmitted light pulses via reflection by one or more objects in the environment of the LIDAR device, wherein the second time occurs after the first time; and a controller, wherein the controller is configured to determine a distance to at least one of the objects based in part on a difference between the second time and the first time. 2. The LIDAR device of clause 1, further comprising a light pipe within the LIDAR device, wherein the internal optical path comprises an optical path that extends through the light pipe. 3. The LIDAR device of clause 2, wherein the light pipe is configured to receive a predetermined percentage of the photons in the one or more transmitted light pulses. 4. The LIDAR device of clause 3, wherein the predetermined percentage is less than 10 percent. 5. The LIDAR device of any of clauses 1-4, wherein the internal optical path comprises reflection by one or more components of the LIDAR device. 6. The LIDAR device of any of clauses 1-5, further comprising: a transparent structure, wherein the transmit optical path passes through the transparent structure, wherein the internal optical path comprises reflection by the transparent structure. 7. The LIDAR device of clause 6, wherein the transparent structure is a dome configured to be mounted on a vehicle. 8. The LIDAR device of clause 6 or 7, wherein the transparent structure comprises an optical window. 9. The LIDAR device of any of clauses 1-8, further comprising: a mirror within the LIDAR device, wherein the transmit optical path comprises reflection by the mirror, wherein the internal optical path comprises reflection by the mirror. 10. The LIDAR device of any of clauses 1-9, further comprising: a light guide configured to guide light by total internal reflection or a reflective coating from an input end to an output end, wherein the transmit optical path comprises a first optical path that extends from the input end of the light guide to the output end of the light guide, wherein the internal optical path comprises the first optical path and further comprises a second optical path that extends from the output end of the light guide to the detector. 11. The LIDAR device of clause 10, wherein the output end of the light guide comprises a mirror. 12. A method comprising: causing a transmitter of a LIDAR device to transmit a first light pulse into an environment of the LIDAR device via a transmit optical path; receiving, by a detector of the LIDAR device, a first portion of the first light pulse at a first time via an internal optical path within the LIDAR device and a second portion of the first light pulse at a second time via reflection by one or more objects in the environment of the LIDAR device; and determining a distance to at least one of the objects based in part on a difference between the second time and the first time. 13. The method of clause 12, further comprising: determining a zero point time based on the first time. 14. The method of clause 12 or 13, further comprising: causing the transmitter to transmit a subsequent plurality of light pulses via the transmit optical path, wherein each subsequent pulse is fired according to a predetermined light pulse schedule; receiving, by the detector, subsequent reflected light pulses at subsequent times via reflection by one or more objects in the environment of the LIDAR device; and determining a distance to the respective objects based on the respective subsequent times, the predetermined light pulse schedule, and the first time. 15. A method comprising: positioning a mirror with respect to a transmitter of a LIDAR device, wherein the transmitter is configured to transmit at least one light pulse; causing the transmitter to transmit a first light pulse so as to interact with the mirror, wherein positioning the mirror is performed such that the first light pulse is directed toward an internal optical path within the LIDAR device; receiving, by a detector of the LIDAR device, the first light pulse at a first time via the internal optical path; and determining a zero point time based in part on the first time. 16. The method of clause 15, further comprising: repositioning the mirror so as to direct subsequent light pulses via a transmit optical path into an environment of the LIDAR device; causing the transmitter to transmit a subsequent plurality of light pulses via the transmit optical path; receiving, by the detector, subsequent reflected light pulses at subsequent times via reflection by one or more objects in the environment of the LIDAR device; and determining a distance to at least one of the objects based on a difference between the respective subsequent times and the zero point time. 17. The method of clause 16, wherein the subsequent light pulses are fired according to a predetermined light pulse schedule, and wherein determining the distance to the object is further based on the predetermined light pulse schedule. 18. The method of any of clauses 15-17, wherein the mirror comprises a rotatable mirror. 19. The method of clause 18, wherein the rotatable mirror comprises a triangular or rectangular prism shape, wherein the rotatable mirror comprises three or four reflective surfaces. 20. The method of clause 19, wherein positioning and repositioning the mirror comprises causing a motor to rotate the rotatable mirror about a rotational axis so as to adjust respective angles of the three or four reflective surfaces.

What is claimed is:

1. A light detection and ranging (LIDAR) device, comprising:

a transmitter configured to transmit one or more light pulses into an environment of the LIDAR device via a transmit optical path;

a detector configured to detect a first portion of the one or more transmitted light pulses and a second portion of the one or more transmitted light pulses, such that the detector receives at a first time the first portion of the one or more transmitted light pulses via an internal optical path within the LIDAR device and receives at a second time the second portion of the one or more transmitted light pulses via reflection by an object in the environment of the LIDAR device, wherein the second time occurs after the first time; and a controller, wherein the controller is configured to:

determine a distance to the object based in part on a difference between the second time and the first time;

transmit a subsequent plurality of light pulses via the transmit optical path, wherein each subsequent light pulse is emitted at a respective time delay according to a predetermined light pulse schedule;

receive subsequent reflected light pulses at subsequent times via reflection by one or more objects in the environment of the LIDAR device; and determine respective distances to the one or more objects based on the respective subsequent times, the respective time delays, and the first time.

2. The LIDAR device of claim 1, further comprising a light pipe within the LIDAR device, wherein the internal optical path comprises an optical path that extends through the light pipe.

3. The LIDAR device of claim 2, wherein the light pipe is configured to receive a predetermined percentage of the photons in the one or more transmitted light pulses.

4. The LIDAR device of claim 3, wherein the predetermined percentage is less than 10 percent.

5. The LIDAR device of claim 1, wherein the internal optical path comprises reflection by one or more components of the LIDAR device.

6. The LIDAR device of claim 1, further comprising:

a transparent structure, wherein the transmit optical path passes through the transparent structure, wherein the internal optical path comprises reflection by the transparent structure.

7. The LIDAR device of claim 6, wherein the transparent structure is a dome configured to be mounted on a vehicle.

8. The LIDAR device of claim 6, wherein the transparent structure comprises an optical window.

9. The LIDAR device of claim 1, further comprising:

a mirror within the LIDAR device, wherein the transmit optical path comprises reflection by the mirror, wherein the internal optical path comprises reflection by the mirror.

10. The LIDAR device of claim 1, further comprising:

a light guide configured to guide light by total internal reflection or a reflective coating from an input end to an output end, wherein the transmit optical path comprises a first optical path that extends from the input end of the light guide to the output end of the light guide, wherein the internal optical path comprises the first optical path and further comprises a second optical path that extends from the output end of the light guide to the detector.

11. The LIDAR device of claim 10, wherein the output end of the light guide comprises a mirror.

12. A method comprising:

causing a transmitter of a light detection and ranging (LIDAR) device to transmit a first light pulse into an environment of the LIDAR device via a transmit optical path;

receiving, by a detector of the LIDAR device, a first portion of the first light pulse at a first time via an internal optical path within the LIDAR device and a second portion of the first light pulse at a second time via reflection by an object in the environment of the LIDAR device;

determining a distance to the object based in part on a difference between the second time and the first time;

causing the transmitter to transmit a subsequent plurality of light pulses via the transmit optical path, wherein each subsequent light pulse is emitted at a respective time delay according to a predetermined light pulse schedule;

receiving, by the detector, subsequent reflected light pulses at subsequent times via reflection by one or more objects in the environment of the LIDAR device; and determining respective distances to the one or more objects based on the respective subsequent times, the respective time delays, and the first time.

13. The method of claim 12, wherein the internal optical path comprises an optical path that extends through a light pipe within the LIDAR device.

14. The method of claim 12, wherein the internal optical path comprises reflection by one or more components of the LIDAR device.

15. The method of claim 12, wherein the transmit optical path passes through a transparent structure, and wherein the internal optical path comprises reflection by the transparent structure.

16. The method of claim 15, wherein the transparent structure comprises an optical window.

17. A method comprising:

positioning a mirror with respect to a transmitter of a light detection and ranging (LIDAR) device, wherein the transmitter is configured to transmit at least one light pulse;

causing the transmitter to transmit a first light pulse so as to interact with the mirror, wherein positioning the mirror is performed such that the first light pulse is directed toward an internal optical path within the LIDAR device;

receiving, by a detector of the LIDAR device, the first light pulse at a first time via the internal optical path;

causing the transmitter to transmit a subsequent plurality of light pulses, wherein each subsequent light pulse is emitted at a respective time delay according to a predetermined light pulse schedule;

repositioning the mirror so as to direct the subsequent plurality of light pulses via a transmit optical path into an environment of the LIDAR device;

receiving, by the detector, subsequent reflected light pulses at subsequent times via reflection by one or more objects in the environment of the LIDAR device; and determining respective distances to the one or more objects based on the respective subsequent times, the respective time delays, and the first time.

18. The method of claim 17, wherein the mirror comprises a rotatable mirror.

19. The method of claim 18, wherein the rotatable mirror comprises a triangular or rectangular prism shape, wherein the rotatable mirror comprises three or four reflective surfaces.

20. The method of claim 19, wherein positioning and repositioning the mirror comprises causing a motor to rotate the rotatable mirror about a rotational axis so as to adjust respective angles of the three or four reflective surfaces.

* * * * *